(12) United States Patent
Hoshino (10) Patent No.: US 7,254,862 B2
(45) Date of Patent: Aug. 14, 2007

(54) WIPER BLADE

(75) Inventor: Takashi Hoshino, Kiryu (JP)

(73) Assignee: Mitsuba Corporation, Gunma (JP)

( * ) Notice: Subject to any disclaimer, the term of this patent is extended or adjusted under 35 U.S.C. 154(b) by 121 days.

(21) Appl. No.: 10/523,157

(22) PCT Filed: Jul. 8, 2003

(86) PCT No.: PCT/JP03/08660

§ 371 (c)(1),
(2), (4) Date: Jan. 27, 2005

(87) PCT Pub. No.: WO2004/012967

PCT Pub. Date: Feb. 12, 2004

(65) Prior Publication Data

US 2006/0162114 A1   Jul. 27, 2006

(51) Int. Cl.
*B60S 1/38* (2006.01)
(52) U.S. Cl. .............. 15/250.47; 15/250.46; 15/250.44; 15/250.43
(58) Field of Classification Search .......... 15/250.43, 15/250.44, 250.451, 250.46, 250.47, 250.361
See application file for complete search history.

(56) References Cited

U.S. PATENT DOCUMENTS

| | | | | |
|---|---|---|---|---|
| 2,589,339 A | | 3/1952 | Carson | 15/245 |
| 2,616,113 A | | 11/1952 | Scinta | 15/255 |
| 2,847,694 A | * | 8/1958 | Chambers | 15/250.43 |
| 2,901,761 A | * | 9/1959 | Wallis | 15/250.47 |
| 2,996,746 A | * | 8/1961 | Vickerson | 15/250.47 |
| 3,041,654 A | * | 7/1962 | Anderson | 15/250.451 |
| 3,116,507 A | * | 1/1964 | Scinta | 15/250.451 |
| 3,140,501 A | * | 7/1964 | MacPherson | 15/250.44 |
| 3,386,126 A | * | 6/1968 | Ruben | 15/250.47 |
| 4,127,912 A | | 12/1978 | Deibel et al. | 15/250 |
| 4,976,001 A | * | 12/1990 | Wright | 15/250.48 |
| 5,131,113 A | | 7/1992 | Roumegoux | 15/250 |
| 5,485,650 A | | 1/1996 | Swanepole | 15/250 |

(Continued)

FOREIGN PATENT DOCUMENTS

FR            2448460            9/1980

(Continued)

OTHER PUBLICATIONS

PCT International Search Report for Serial No. PCT/JP2003/008660 dated Aug. 27, 2003.

*Primary Examiner*—Gary K. Graham
(74) *Attorney, Agent, or Firm*—McCormick, Paulding & Huber LLP (57) ABSTRACT

A holder piece assembly having holder pieces continuously arranged and leaf spring members connecting between each holder piece, and being curved in the longitudinal direction by elastic force of elastic members is provided. The holder piece assembly is mounted on the front edge of a wiper arm through a clip pin. Blade rubber for wiping window glass surface is mounted on the holder piece assembly. The elastic force of the leaf spring members elastically deformed when the blade rubber is allowed to conform with the window glass surface can disperse the pressing force of the wiper arm over the blade rubber longitudinal direction. The dispersed pressing force can be set by changing the connecting angle between each holder piece according to the window glass curvature thereby the wiper blade versatility is improved.

6 Claims, 8 Drawing Sheets

U.S. PATENT DOCUMENTS

| | | | |
|---|---|---|---|
| 6,161,248 A | 12/2000 | Merkel et al. | .................. 15/250 |
| 6,427,283 B1 * | 8/2002 | Dietrich et al. | .......... 15/250.32 |
| 2002/0053112 A1 * | 5/2002 | Ohyama | .................. 15/250.43 |

FOREIGN PATENT DOCUMENTS

| | | | |
|---|---|---|---|
| GB | 427383 | * | 4/1935 |
| GB | 1425568 | * | 2/1976 |
| JP | 54090730 | | 7/1979 |
| JP | 63-1999868 | | 12/1988 |
| JP | 1-178168 | | 12/1989 |
| JP | 4232151 | | 8/1992 |
| JP | 6340249 | | 12/1994 |
| JP | 09039743 A | | 2/1997 |
| JP | 10006932 A | | 1/1998 |
| JP | 2000-503280 | | 3/2000 |
| JP | 2001328511 A | | 11/2001 |

* cited by examiner

WIPER BLADE

CROSS REFERENCE TO RELATED APPLICATIONS

This application is entitled to the benefit of and incorporates by reference essential subject matter disclosed in international Patent Application No. PCT/JP2003/008660 filed on Jul. 8, 2003 and Japanese Patent Application No. 2002-223805 filed on Jul. 31, 2002.

BACKGROUND OF THE INVENTION

1. Technical Field

The present invention relates to a wiper blade for wiping the surface of a window glass of vehicles.

2. Background Art

A wiper blade mounted on vehicles such as automobiles is used for wiping off such as rain, snow, insects and splash from the preceding vehicle which are attached to a window glass in order to assure the field of view of a driver. The wiper blade is mounted on the front edge of the wiper arm connected to such as electric motors and reciprocally oscillates within a wiping area which is set on the window glass surface. The wiper arm is provided with a spring therein, and the wiper blade is pressed against the window glass surface by a pressing force transmitted from the spring through the wiper arm. Thus the wiper blade can wipe off the window glass by the reciprocal oscillating and the pressing force of the wiper arm.

In order to obtain the preferred wiping performance, the pressing force from the wiper arm should be dispersed over the longitudinal direction of the blade rubber contacting the window glass surface. Thus a wiper blade in which a blade rubber and a wiper arm are connected by multi-construction assembled levers is developed and the pressing force is dispersed through the levers. As disclosed in Japanese Patent Application Laid-Open Publication No. 6-340249, the following wiper blade has been developed: a plate type elastic member is mounted over the back face of the blade rubber, and the pressing force from the wiper arm connected to the central portion of the elastic member is dispersed over the longitudinal direction of the blade rubber through the elastic member. The thickness and the width of the elastic member change in the longitudinal direction thereby the dispersed pressure according to the window glass surface to be wiped is applied to the blade rubber.

However, it has possibility that the pressing force which is dispersed to the both end portions is less than the pressing force by the wiper arm which acts on the center because a single elastic plate material is attached to the blade rubber. Additionally, elasticity generated when contacting the window glass surface, i.e. a dispersed pressing force is set depend on changing the width and thickness of the plate material, so that the wiper blade should be set according to the curvature of the window glass surface.

Further, the curvature of window glasses for vehicles is likely to be made different between various types of vehicles because of the design, so that it was necessary to set the dedicated wiper blade for each type of vehicle. Therefore, the versatility of wiper blades is reduced and the production cost of wiper blades may have to increase.

An object of the present invention is to provide the versatility of wiper blades for window glasses having different curvature.

SUMMARY OF THE INVENTION

The wiper blade of the present invention is mounted on a wiper arm oscillatingly provided on the car body and is reciprocally oscillated as being pressed on a window glass by the wiper arm to wipe the window glass surface. The wiper blade comprises a blade rubber for wiping the window glass surface, and a holder piece assembly including a plurality of holder pieces for holding the blade rubber and elastic members for connecting the holder pieces in the longitudinal direction.

Thereby the dispersed pressing force on the wiper blade can be set at the connecting portion of each of the holder pieces. The conventional wiper blades should be exclusively set for each type of vehicles because the curvature of the window glass is different between various types of vehicles. While, since the wiper blade according to the present invention can average the dispersed pressing force by changing the connecting angle between each of the holder pieces according to the curvature of the window glass even if it is comprised of the same components, its versatility can be improved. Additionally, if the curvature of the window glass is too large to average the dispersed pressing force only by changing the connecting angle between each holder piece, the length of the holder piece is changed and the elastic modulus of the elastic member is changed so that the pressing force can be averaged by only replacing the minimum component.

Since the configuration of the wiper blade of the present invention is simple, the operation of the wiper blade is not blocked and the pressing force can be uniformly dispersed over the blade rubber so that the wiping performance is stabilized. Additionally, the simple configuration of the wipe blade achieves the reduction of the production cost and can be reduced in its height thereby to be downsized. Further, the wiper blade of the present invention is also allowed to conform to the window glass surface having a large curvature and a complicated curved shape and can be easily obtained the dispersed pressing force required for wiping by changing the elastic modulus of the elastic member and the length of the holder piece.

The wiper blade of the present invention is characterized in that the radius of curvature of the holder piece assembly which is curved by the elastic member when the blade rubber is apart from the window glass surface is smaller than the radius of curvature of the window glass surface. Thereby when the wiper blade is contacted to the window glass surface, each elastic member can be elastically deformed so that the pressing force from the wiper arm is dispersed over the longitudinal direction of the wiper blade.

The wiper blade of the present invention is characterized in that the holder pieces are integrally molded with the elastic member. Thereby the production cost can be reduced.

The wiper blade of the present invention is characterized in that the wiper blade comprises a plurality of elastic members and the elastic members connect between each holder piece. Thereby the elastic modulus of the elastic members can be easily changed.

The wiper blade of the present invention is characterized in that the wiper blade has an auxiliary member for positioning the plurality of elastic members in the longitudinal direction to connect the elastic members. Thereby the production cost can be reduced.

The wiper blade of the present invention is characterized in that the holder pieces are gradually tapered to the adjacent another holder piece. Thereby the operation of the holder piece assembly is not blocked and the wiping performance can be stabilized.

The wiper blade of the present invention is characterized in that the holder piece is provided with a holding claw for holding the blade rubber. Thereby the wiper rubber can be easily attached and detached to/from the wiper blade.

DETAILED DESCRIPTION OF THE PREFERRED EMBODIMENTS

Figure 1:
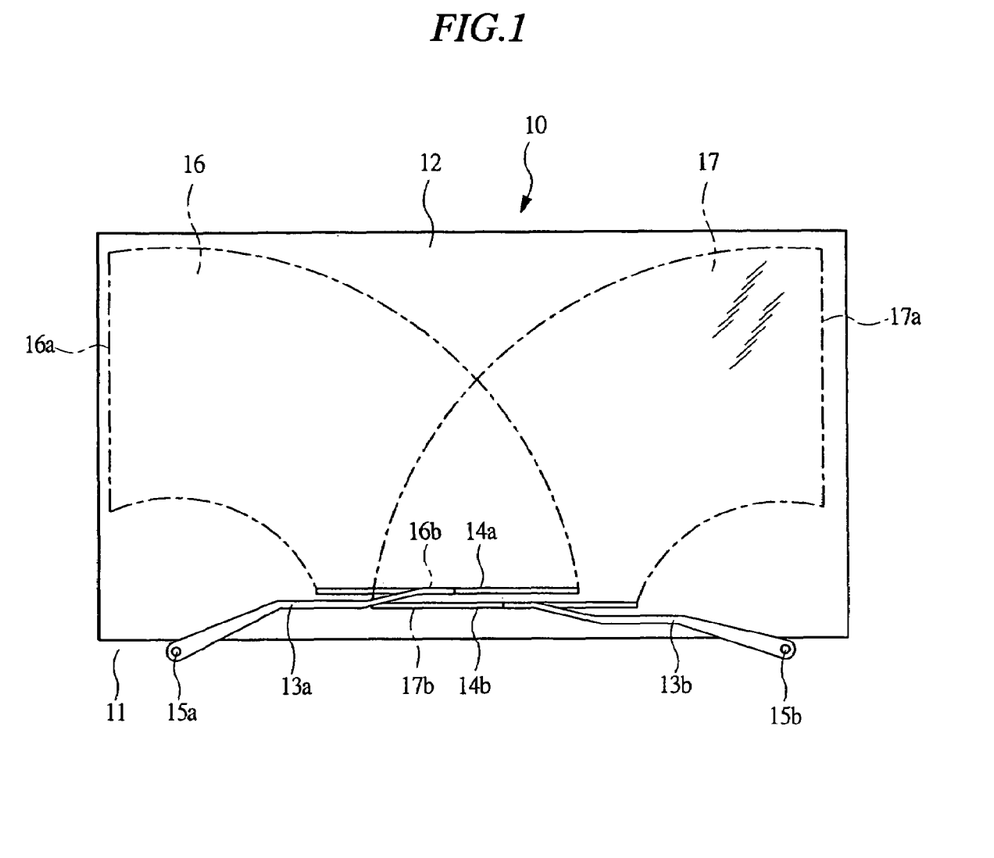
FIG. 1 is a schematic view showing the wiper apparatus comprises the wiper blade according to one embodiment of the present invention.

As shown in FIG. 1, a wiper apparatus 10 is an opposed-wiping type wiper apparatus_which is mounted on a car body 11 to wipe off rain and splash from the preceding vehicle attached to a window glass 12 (hereinafter referred to as glass 12) of the car body 11 in order to assure the field of view of the driver. Wiper arm 13a of the driver's seat side and wiper arm 13b of the passenger's seat side are oppositely mounted each other, and wiper blade 14a and 14b are mounted to each front edge of the wiper arm 13a and 13b, respectively. The wiper blade 14a and 14b are elastically and forcingly contacted the glass 12 by such as springs (not shown in the figure) mounted in the wiper arm 13a and 13b.

Wiper shaft 15a and 15b are provided on both right and left end portions of the car body 11. A rotating force of the wiper motor (not shown in the figure) is transmitted to a wiper shaft 15a and 15b through a linkage (not shown in the figure) thereby the wiper shaft 15a and 15b are forward-oscillated and reverse-oscillated repeatedly at a predetermined oscillating angle. Each end portion of the wiper arm 13a and 13b is mounted to the wiper shaft 15a and 15b, respectively. When the wiper shaft 15a and 15b are rotated, the wiper arm 13a and 13b are oscillated at a predetermined oscillating angle. Therefore, each wiper blade 14a and 14b is reciprocally oscillated between upper reversing positions 16a and 17a set on the vicinity of both right and left sides of the glass 12 and lower reversing positions 16b and 17b set on the vicinity of the bottom of the glass 12 thereby to wipe off such as raindrops attached to wiping areas 16 and 17 (indicated by each alternate long and short dash line in FIG. 1). In the idle state as shown in the figure, the wiper blade 14b of the passenger's seat side is disposed in the vicinity of the bottom of the glass 12 and the wiper 14a of the driver's seat side is disposed above the wiper blade 14b.

Figure 2:
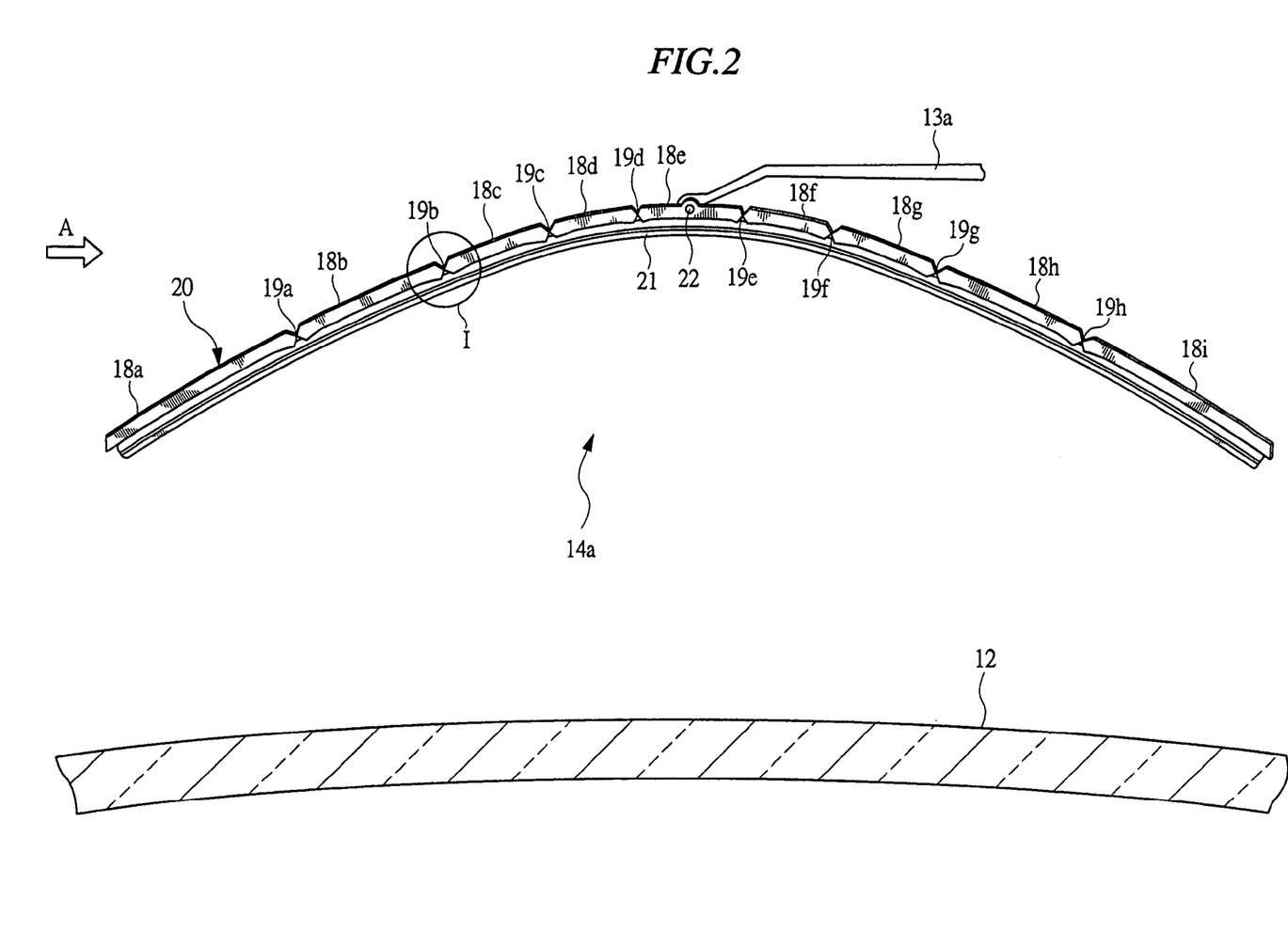
FIG. 2 is a front view showing the wiper blade in FIG. 1 which is apart from the glass.
Figure 3:
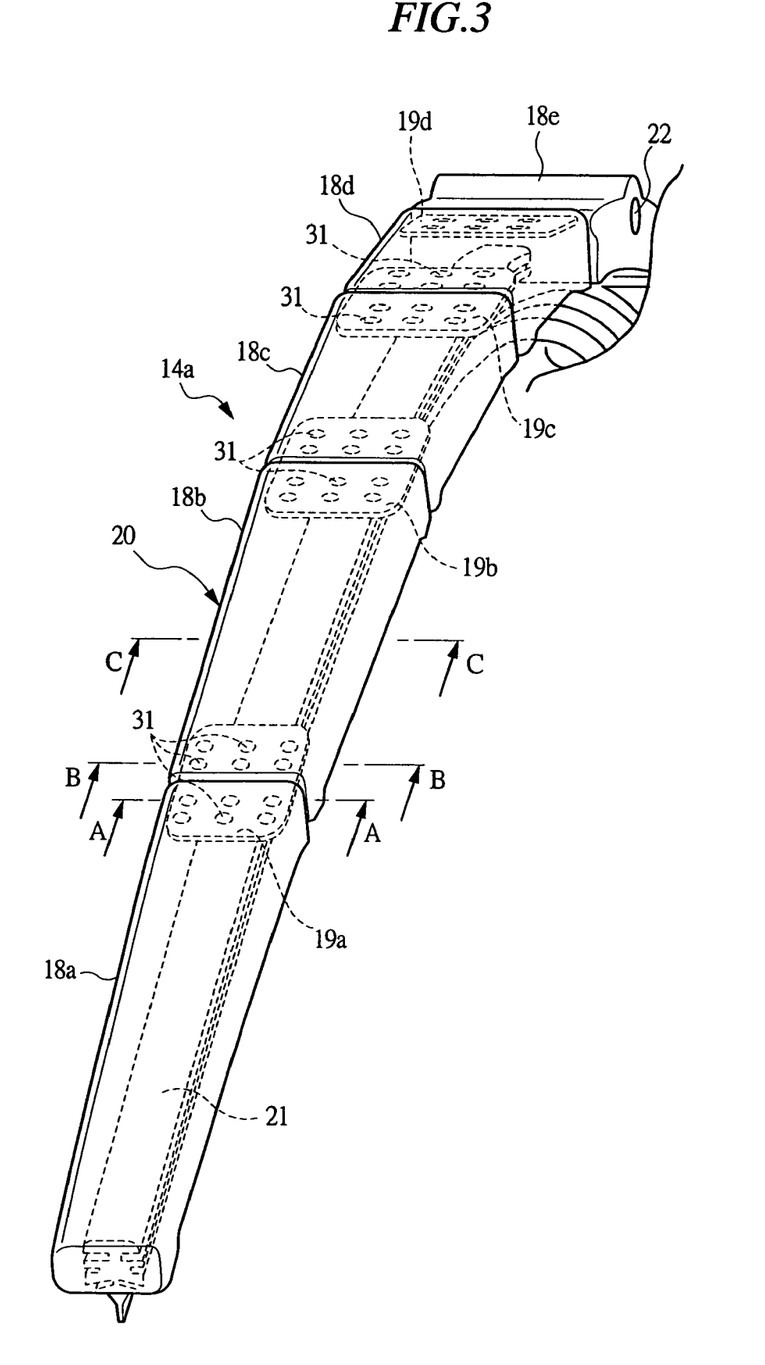
FIG. 3 is a perspective view showing a part of the wiper blade in FIG. 2 from the direction of arrow A.

FIG. 2 is a front view showing the wiper blade 14a in FIG. 1 which is in the state apart from the glass 12, and FIG. 3 is a perspective view showing a part of the wiper blade 14a in FIG. 2 from the direction of arrow A. The member indicated by the broken line in FIG. 3 is incorporated into the wiper blade 14a. Incidentally, the wiper blade 14a of the driver's seat side is shown in the figure here, and also the wiper blade 14b of the passenger's seat side has the same configuration as the 14a.

As shown in FIG. 2 and FIG. 3, the wiper blade 14a has holder pieces 18a-18i having generally rectangular solid shape which is made of the resin material. The holder pieces 18a-18i are continuously arranged in the longitudinal direction to form a holder piece assembly 20. Each of the holder pieces 18a-18i is interconnected by leaf spring members 19a-19h as the elastic members provided therein, and each of the holder pieces 18a-18i is interconnected at a predetermined connecting angle. That is to say, the leaf spring members 19a-19h apply the elastic force to each of the holder pieces 18a-18i in the closing direction toward the glass 12 thereby the holder piece assembly 20 is curved in the longitudinal direction by the elastic force from the leaf spring members 19a-19h. Blade rubber 21 for wiping the glass 12 surface by slidably contacting thereto is held on the bottom of the holder piece assembly 20. Clip pin 22 is provided on the holder piece 18e approximately centered on the holder piece assembly 20. The front edge of the wiper arm 13a and the wiper blade 14a are connected therebetween via the clip pin 22. The radius of curvature of the holder piece assembly 20 curved in the longitudinal direction is set to smaller than the radius of curvature of the glass 12.

Figure 4A:
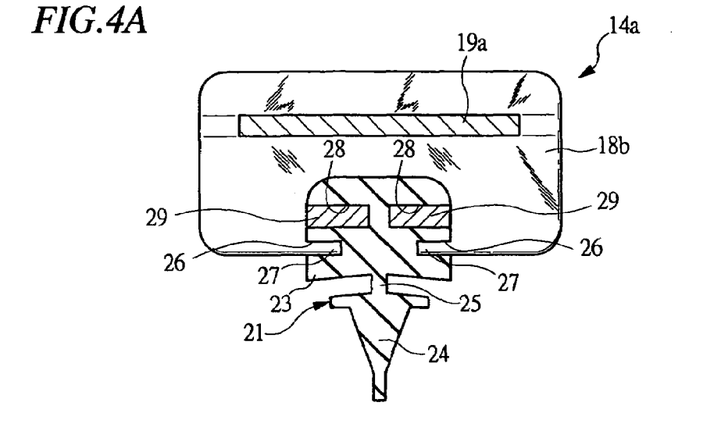
FIG. 4A is a sectional view taken along the A-A line in FIG. 3.
Figure 4B:
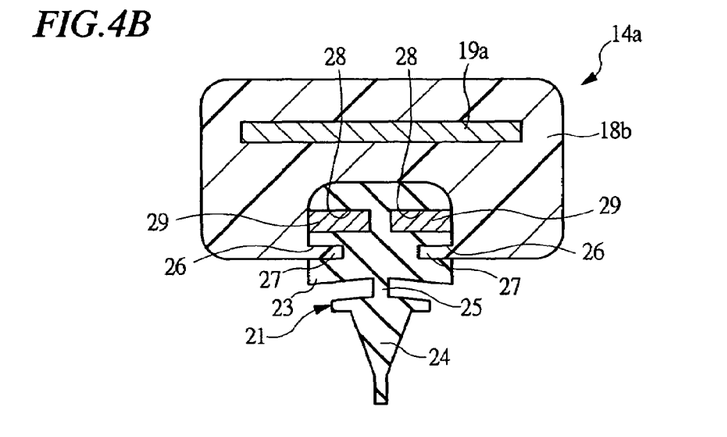
FIG. 4B is a sectional view taken along the B-B line in FIG. 3
Figure 4C:
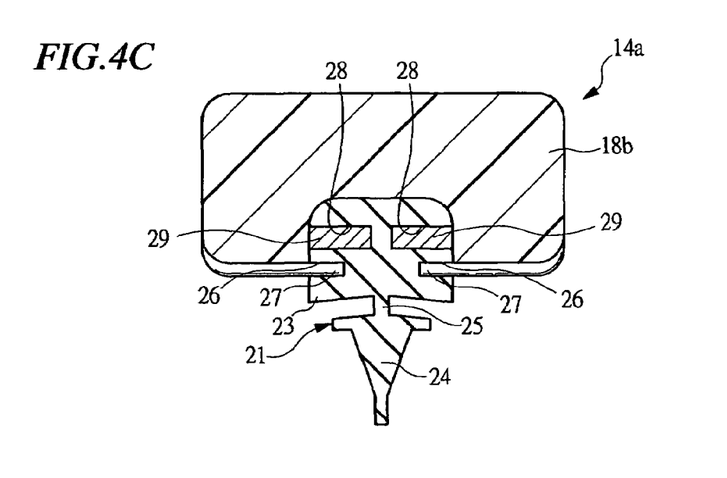
FIG. 4C is a sectional view taken along the C-C line in FIG. 3.

FIG. 4A is a sectional view showing the wiper blade 14a taken along the A-A line in FIG. 3, FIG. 4B is a sectional view showing the wiper blade 14a taken along the B-B line in FIG. 3 and FIG. 4C is a sectional view showing the wiper blade 14a taken along the C-C line in FIG. 3, respectively.

As shown in FIGS. 4A-4C, the blade rubber 21 for wiping the glass 12 surface has a base 23 held by the holder pieces 18a-18i and edge 24 for wiping in contact with the glass 12 surface. The base 23 and the edge 24 are connected through a neck portion 25 formed in an elongated shape. The edge 24 can be moved with inclining by means of the neck portion 25 and is maintained at an appropriate contact angle in order to completely wipe off during contacting the glass 12 surface. The base 23 is provided with retaining grooves 26. The retaining grooves 26 are engaged with holding claws 27 which are formed at both bottom ends of each of the holder pieces 18a-18i so that the blade rubber 21 is held to the holder pieces 18a-18i. Further, supporting grooves 28 are formed above the retaining grooves 26, and thin plate shaped metal cores, i.e. vertebras 29 are inserted into the supporting grooves 28. The vertebras 29 provide a predetermined rigidity to the base 23 of the blade rubber 21.

The retaining groove 26 and the holding claw 27 have a slight gap therebetween thereby the blade rubber 21 is attachable and detachable to/from the holder piece assembly 20. Any one end face of the holder pieces 18a and 18i which are disposed at both end of the wiper blade 14a is opened to have the blade rubber 21 inserted therethrough so that only the blade rubber 21 can be easily replaced. The opening portion of the holder pieces 18a or 18i is closed by a cap member (not shown in the figure) after inserting the blade rubber 21 therethrough thereby the blade rubber 21 is prevented from dropping off.

The material for the blade rubber is such as natural rubber and chloroprene rubber, and the composite material of the natural rubber and chloroprene rubber is commonly used so as to have both advantages. The blade rubber 21 is produced by extrusion molding those materials and has a uniform cross-section in the longitudinal direction.

The leaf spring members 19a-19h connecting each of the holder pieces 18a-18i are provided in the holder piece 18a-18i above the blade rubber 21. A mold for molding the resinous holder pieces 18a-18i is previously provided with the leaf spring members 19a-19h and the holder pieces 18a-18i and the leaf spring members 19a-19h are integrally produced upon molding the holder pieces 18a-18i. As shown in FIG. 3, the leaf spring members 19a-19h are provided with a plurality of through-holes 31 serving as stoppers for preventing from falling off. The resin is supplied into the through-holes 31 on molding thereby the leaf spring members 19a-19h are prevented from falling off.

Incidentally, the stoppers are not limited to the plurality of through holes 31 but single through hole 31 or a cavity may be applied. The shape is not limited to a circle but the other shape such as a rectangle may be applied. Additionally, the thickness of the leaf springs 19a-19h may as well be partially changed to prevent from falling off thereof.

As thus described above, the holder piece assembly 20 can be easily produced by molding a plurality of holder pieces 18a-18i together with the leaf spring members 19a-19h without assembly processes. Then, the blade rubber 21 including the vertebras 29 therein are inserted through the holding claws 27 of the holder piece assembly 20 so that the wiper blade 14a can be completed. That is, the wiper blade 14a of the present invention is easily produced without assembling a number of levers as the conventional wiper blades so that the production cost of the wiper blade 14a can be reduced. Additionally, since it dose not have the levers assembled in multi-constructions, the compact wiper blade 14a is achieved.

Figure 5:
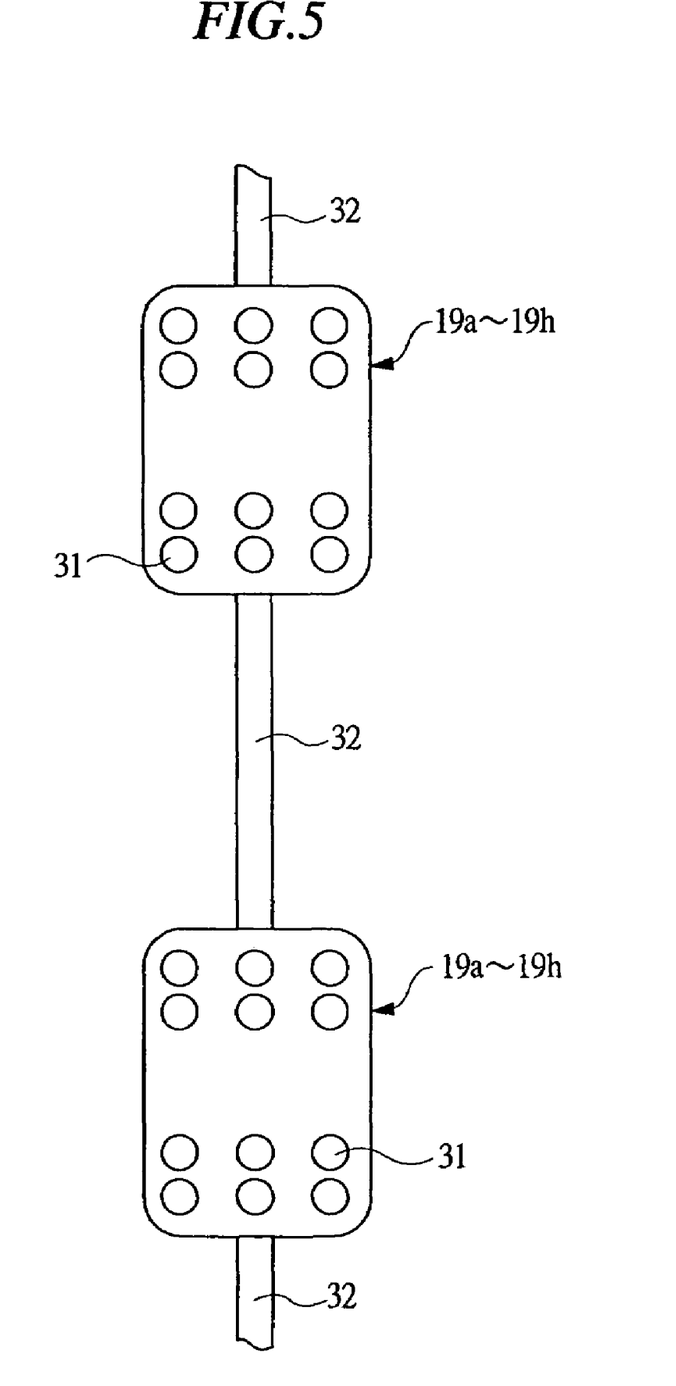
FIG. 5 is a plane view showing one example of the leaf spring members before molding.

FIG. 5 is a plan view showing one example of the leaf spring members before molding. As shown in FIG. 5, each of the leaf spring members 19a-19h may be connected through an auxiliary member 32. The connection through the auxiliary member 32 can allow the leaf spring members 19a-19h to be previously positioned as the molding arrangement. Thereby the individual leaf spring member 19a-19h can be easily arranged. Alternatively, instead of providing the auxiliary member 32 as the separate body from the leaf spring members 19a-19h, the leaf spring members 19a-19h are cut out in the connecting state on forming of the leaf spring members 19a-19h and then the connected portions may be folded at a predetermined angle.

In stead of integrally molding the holder piece assembly 20 with the leaf spring members 19a-19h being inserted therein, another forming process can be applied such that separate type holder pieces are provided and then the leaf spring members 19a-19h are sandwiched between the holder pieces to form the holder piece assembly 20. The above described process is especially effective to produce small amount and various types of wiper blades.

Figure 6:
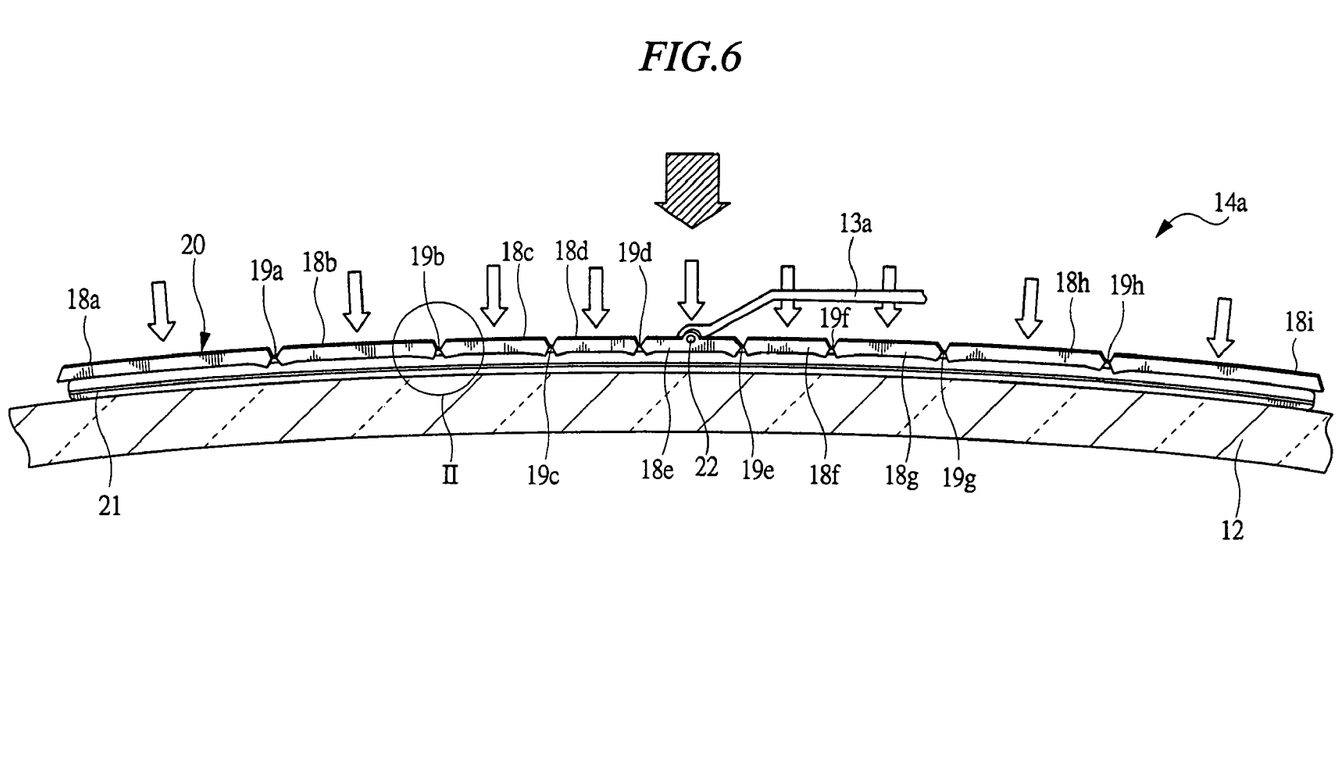
FIG. 6 is a front view showing the wiper blade in FIG. 2 which is pressed on the glass.

Next, the pressing force from the wiper arm 13a which is dispersed over the longitudinal direction of the wiper blade 14a is described. FIG. 6 is a front view showing that the wiper blade 14a in FIG. 2 is pressed against the glass 12. The arrow with slanted line shows the pressing force from the wiper arm 13a, and the plain arrows show the dispersed pressing force.

As shown in FIG. 6, when the wiper blade 14a is contacted to the glass 12 surface by the pressing force from wiper arm 13a, the holder piece assembly 20 having a radius of curvature smaller than that of the glass 12 surface allows the radius of curvature thereof to conform with the radius of curvature of the glass 12 surface, while elastically deforming the leaf spring members 19a-19h connecting between each of the holder pieces 18a-18i. Therefore, the blade rubber 21 held by the holder piece assembly 20 becomes closely contacted to the glass 12 surface.

Figure 7A:
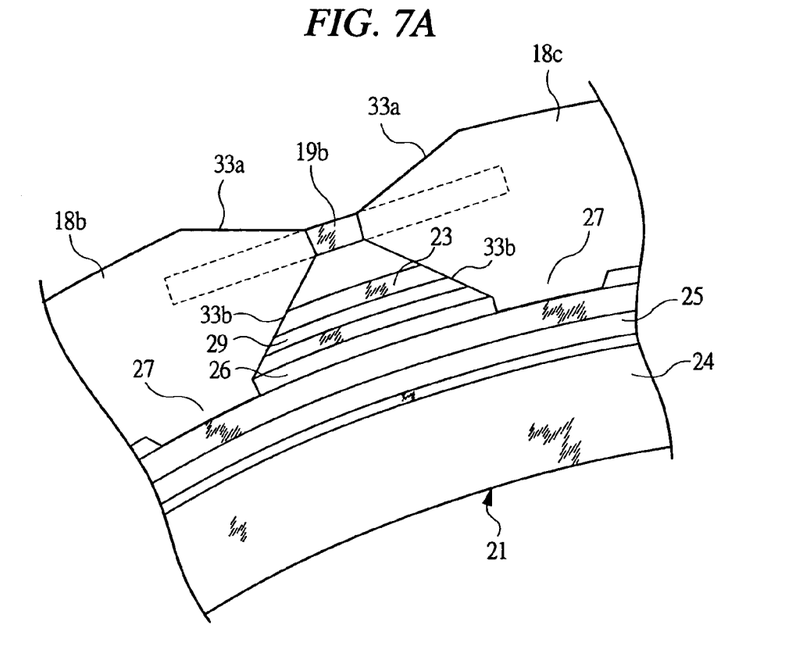
FIG. 7A is an enlarged view showing the range I in FIG. 2
Figure 7B:
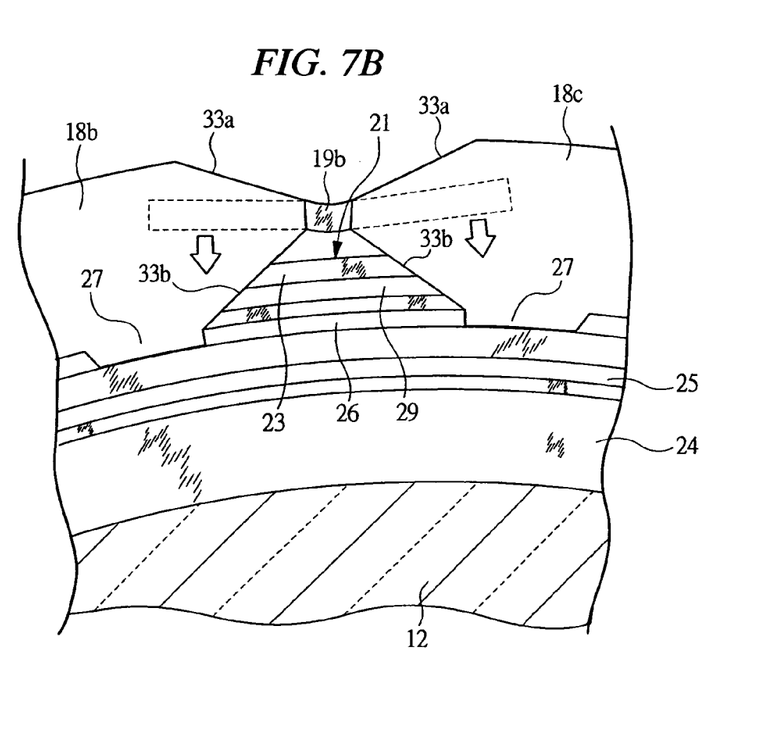
FIG. 7B is an enlarged view showing the range II in FIG. 6.

FIG. 7A is an enlarged view showing the range I in FIG. 2, and FIG. 7B is an enlarged view showing the range II in FIG. 6. As shown in FIG. 7A, when the wiper blade 14a is apart from the glass 12 surface as a releasing state, the leaf spring members 19a-19h connecting each of the holder pieces 18a-18i are in the state applied with the gravity affecting the holder piece assembly 20 and with the blade rubber 21 and the reaction force by which the blade rubber 21 is inclined to recover from the curved state. Therefore, the leaf spring members 19a-19h are not applied with any external force other than the gravity and the reaction force, and become not elastically deformed in large.

Next, as shown in FIG. 7B, when the wiper blade 14a is contacted to the glass 12 surface as a restraining state, the leaf spring members 19a-19h for connecting each of the holder pieces 18a-18i are elastically deformed according to the curvature variation of the holder piece assembly 20. As shown in the figure, the end of each of the holder pieces 18a-18i has inclined surfaces 33a and 33b such that the holder pieces 18a-18i are gradually tapered toward the adjacent holder pieces 18a-18i. Thereby the adjacent holder pieces 18a-18i do not abut each other so that the curvature variation of the holder piece assembly 20 is not limited. Then, the holder pieces 18a-18i are applied with the elastic force in the indicated direction by the arrow as shown in FIG. 7B from the elastic deformed leaf spring members 19a-19h. The elastic force is transmitted to the blade rubber 21 through the holder pieces 18a-18i thereby a uniform thin water screen is created between the blade rubber 21 and the glass 12 so that the field of view can be assured.

As shown by the outline arrows in FIG. 6, the elastic force from the each leaf spring member 19a-19h becomes force for pressing each of the holder pieces 18a-18i to the direction of the glass 12 and the force is transmitted in the longitudinal direction of the blade rubber 21 through the holder pieces 18a-18i. Accordingly, the pressing force which is applied at a point from the wiper arm 13a as shown by the shaded arrows varies the curvature of the holder piece assembly 20 and becomes force for elastically deforming each leaf spring member 19a-19h, while the elastic force from each leaf member 19a-19h is transmitted to the contact surface of the blade rubber 21 contacting to the glass 12 so that the pressing force of the wiper arm 13a is dispersedly transmitted over the longitudinal direction of the wiper blade 14a. That is, the leaf spring members 19a-19h are elastically deformed by the pressing force from the wiper arm 13a such that the holder piece assembly 20 is allowed to conform with the curvature of the glass 12. The reaction force of the leaf spring members 19a-19h caused by the elastic deformation is transmitted to the holder pieces 18a-18i thereby the holder piece assembly 20 generates force for pressing the blade rubber 21 against the glass 12. Additionally, the vertebra 29 is mounted to the blade rubber 21. When the holder piece assembly 20 is applied with the pressing force of the wiper arm 13a, the blade rubber 21 is applied with the elastic force of the vertebra 29 together with the reaction force of the leaf spring members 19a-19h. Thereby the reaction force of the leaf spring members 19-19h which is discontinuously applied in the longitudinal direction of the blade rubber 21 is corrected by the elastic force of the vertebra 29 which continuously generates in the longitudinal direction so that the pressure distribution of the blade rubber 21 over the glass 12 is made uniform in the longitudinal direction.

Thus the average pressing force is distributed in the longitudinal direction of the blade rubber 21 by dispersing the pressing force over the blade rubber 21. Therefore the wiping performance of the wiper blade 14a can be uniformly achieved.

Additionally, if the length of the individual holder piece 18a-18i constituting the holder piece assembly 20 and the elastic modulus of the individual leaf spring member 19a-19h are changed, the pressing force of the blade rubber 21 for dispersing over the longitudinal direction can be easily changed. Therefore, the wiper blade 14a which can adapt to the other type of vehicles, i.e. the glass 12 having the different curvature is achieved while most of components constituting the wiper blade 14a can be commonly used. Further, if the glass has a large curvature and a complicated curved surface shape, it can be easily conformed only by exchanging components of the blade rubber 21 thereby the pressing force for wiping can be uniformly dispersed over the longitudinal direction of the blade rubber 21. Incidentally, even if the holder piece assembly 20 is set to as described above, it is not enlarged in size.

Additionally, the gap of the holder piece assembly 20 of the wiper blade 14a is not large enough to be intervened by snow and ice so that the operation of the holder piece assembly 20 is not blocked. Therefore, the pressing force is constantly and uniformly dispersed over the blade rubber 21 without being affected by the weather so that the stability of the wiping performance can be achieved.

Further since the holder piece assembly 20 is provided over the top surface of the blade rubber 21, the blade rubber 21 is prevented from exposing to sun beam thereby the deterioration caused by the aging of the blade rubber 21 can be reduced. Additionally, the design of the wiper blade 14a also can be improved by using the holder piece assembly 20.

Figure 8:
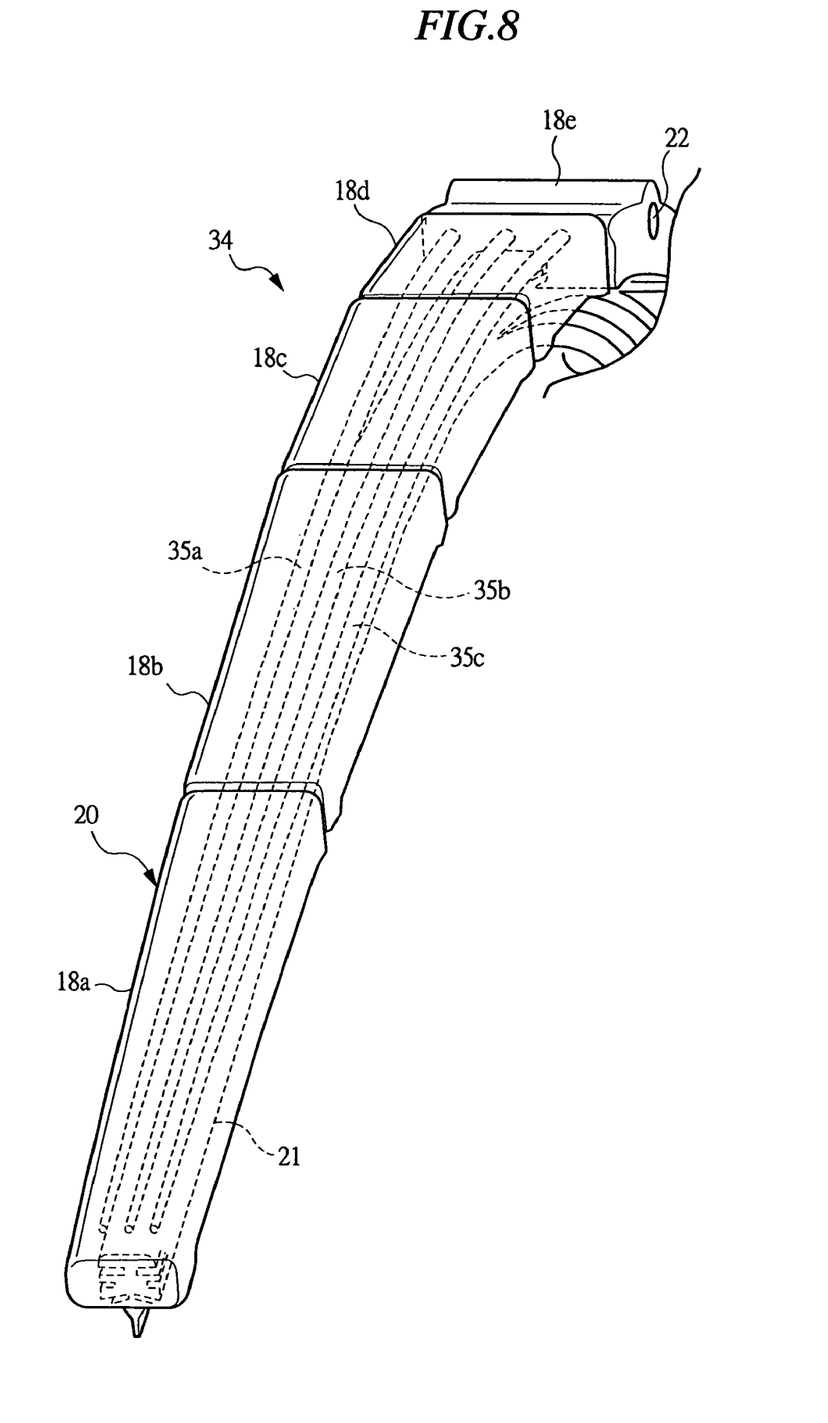
FIG. 8 is a perspective view showing a part of the wiper blade according to another embodiment of the present invention.

FIG. 8 is a perspective view showing a part of the wiper blade 34 according to another embodiment of the present invention. As shown in FIG. 8, elastic members are not limited to the leaf spring members 19a-19h which individually connects each of the holder pieces 18a-18i, and rod spring members 35a-35c for connecting the holder pieces 18a-18i therethrough may be applied. The rod spring members 35a-35c are integrally molded with the holder pieces 18a-18i after bending at a predetermined angle. Alternatively, the holder pieces 18a-18i may be penetrated therethrough by the coupled leaf spring members 19a-19h. In other words, the elastic members are not only provided between each of the holder pieces 18a-18i, but also three or more holder pieces may be connected by one elastic member. Thereby the number of processes on molding can be decreased so that the production cost is reduced.

It is to be understood that the present invention is not intended to be limited to the above described embodiments, and various changes may be made therein without departing from the spirit of the present invention. For example, the holder piece assembly 20 is formed of nine holder pieces 18a-18i made of the resin material in the present embodiment, however, the number of holder pieces may be changed according the length of the wiper blade to be set and the curved shape of the glass 12 to be wiped, and the holder pieces 18a-18i may be made of such as metals other than the resin.

Additionally, the inclined surface 33b formed below among the inclined surface 33a and 33b which are formed on the end of the holder pieces 18a-18i may be eliminated because it dose not affect the direction to which the curvature of the holder piece assembly 20 is decreased.

Further, the slight gap is provided between the leaf spring members 19a-19h and the blade rubber 21, however, it may be narrowed to the extent that the elastic deformation of the leaf spring members 19a-19h is not blocked.

Further, as to the attaching portion of the arm, not only the connecting by the clip according to the present embodiment, but also the connecting portion such as a U shaped arm and a bayonet type arm may be used.

Incidentally, the wiper blade of the present invention is described based on the wiper blade 14a of the driver's seat side, however the wiper blade 14b of the passenger's seat side may be of course applied to the present invention.

The present invention can be applied to produce various wiper blades which are conformed to window glasses having each different curvature.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A wiper blade mounted on a wiper arm which is oscillatingly provided on a car body for wiping a window glass surface by being pressed on the window glass surface by the wiper arm and being reciprocally oscillated, the wiper blade comprising:
    a blade rubber for wiping the window glass surface; and
    a holder piece assembly including a plurality of holder pieces for holding the blade rubber and an elastic member for connecting the holder pieces to each other in the longitudinal direction, the elastic member being provided in each of the holder pieces;
    wherein a gap is provided between a retaining groove formed in the blade rubber and a holding claw formed in each of the holder pieces, whereby the blade rubber is attachable to, and detachable from, the holder piece assembly; and
    wherein a supporting groove is formed above the retaining groove and a vertebra is inserted into the supporting groove, whereby the vertebra provides a predetermined rigidity to the blade rubber.

2. The wiper blade according to claim 1, wherein when the blade rubber is apart from the window glass surface, radius of curvature of the holder piece assembly curved by the elastic member is smaller than a radius of curvature of the window glass surface.

3. The wiper blade according to claim 1, wherein the holder pieces are integrally molded with the elastic member.

4. The wiper blade according to claim 1, wherein the wiper blade comprises a plurality of elastic members that connect the holder pieces therebetween.

5. The wiper blade according to claim 4, wherein the wiper blade further comprises an auxiliary member for positioning the plurality of elastic members in the longitudinal direction to connect the elastic members.

6. The wiper blade according to claim 1, wherein the holder pieces are formed to be gradually tapered toward the adjacent another holder piece.

* * * * *